US009302405B2

(12) United States Patent
Rubens et al.

(10) Patent No.: US 9,302,405 B2
(45) Date of Patent: Apr. 5, 2016

(54) PLANER ACCESSORY TOOL FOR AN OSCILLATING POWER TOOL

(75) Inventors: Jeremy Rubens, Palatine, IL (US); Edward Abante, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 1170 days.

(21) Appl. No.: 13/283,847

(22) Filed: Oct. 28, 2011

(65) Prior Publication Data

US 2013/0104719 A1 May 2, 2013

(51) Int. Cl.
B27B 19/00 (2006.01)
B27C 1/10 (2006.01)
B24B 23/04 (2006.01)
B23D 61/00 (2006.01)
B27C 1/00 (2006.01)

(52) U.S. Cl.
CPC ............ *B27B 19/006* (2013.01); *B23D 61/006* (2013.01); *B24B 23/04* (2013.01); *B27C 1/002* (2013.01); *B27C 1/10* (2013.01); *Y10T 83/9319* (2015.04)

(58) Field of Classification Search
CPC ....... B23D 71/005; B23D 5/00; B23D 61/006
USPC .................. 83/835, 875; 407/29.13; 606/178; 30/493
See application file for complete search history.

(56) References Cited

U.S. PATENT DOCUMENTS

| 558,739 | A | * | 4/1896 | Pickering | ................ B28D 1/20 125/38 |
| 2,256,847 | A | * | 9/1941 | Osenberg | ............... B23B 27/00 15/236.01 |
| 3,468,079 | A | * | 9/1969 | Kaufman | ...................... 451/510 |
| 3,509,611 | A | | 5/1970 | Kifer | |
| 3,852,881 | A | * | 12/1974 | Treace | ............................. 30/92 |
| 3,869,773 | A | * | 3/1975 | Gneiding | ................... 407/29.13 |
| 4,083,166 | A | * | 4/1978 | Haas | ............................. 56/13.7 |
| 4,315,450 | A | * | 2/1982 | Pray | .................................. 83/862 |
| 4,656,910 | A | * | 4/1987 | Peterson | ........................ 83/875 |
| 4,872,452 | A | | 10/1989 | Alexson | |
| 5,231,910 | A | * | 8/1993 | Harsch et al. | ................... 83/875 |
| 5,361,570 | A | * | 11/1994 | Bernardy | ....................... 56/255 |
| 5,875,700 | A | * | 3/1999 | Powell | ............................ 83/837 |
| 6,751,876 | B2 | * | 6/2004 | Herold | ............................ 30/486 |
| 7,001,403 | B2 | * | 2/2006 | Hausmann et al. | ........... 606/178 |
| 7,171,798 | B1 | * | 2/2007 | Bernardy | ....................... 56/295 |
| 7,882,774 | B1 | * | 2/2011 | Bernardy | ....................... 83/835 |
| 2004/0200334 | A1 | * | 10/2004 | Souza et al. | .................... 83/835 |
| 2008/0147084 | A1 | * | 6/2008 | Bleich et al. | .................. 606/114 |

* cited by examiner

*Primary Examiner* — Kenneth E Peterson
(74) *Attorney, Agent, or Firm* — Maginot Moore & Beck LLP (57) ABSTRACT

An accessory for a power tool includes a mounting portion configured to mate with an oscillating drive member of a power tool and a substantially planar guide portion extending forwardly of the mounting portion to a leading edge and defining a guide plane. A cantilever arm is located between the mounting portion and the leading edge. The cantilever arm extends downwardly from the guide plane and forwardly toward the leading edge. A plurality of teeth extends from a forward portion of the cantilever arm.

3 Claims, 8 Drawing Sheets

PLANER ACCESSORY TOOL FOR AN OSCILLATING POWER TOOL

TECHNICAL FIELD

This invention relates to the field of oscillating power tools, and more particularly to accessory tools for use with oscillating power tools.

BACKGROUND

Oscillating power tools are lightweight, handheld tools configured to oscillate various accessory tools and attachments, such as cutting blades, sanding discs, grinding tools, and many others. The accessory tools enable the oscillating power tool to be used to shape and contour workpieces in a wide variety of ways. Previously known accessory tools, however, are limited in their ability to perform one common woodworking task known as planing.

Planing is the process of flattening, thinning, or applying a smooth finish to a surface of workpiece, such as a board or piece of wood. Some previously known accessory tools are capable of performing planing tasks to a certain degree. For example, a flush cutting blade accessory for an oscillating tool can be used to trim or shave thin layers of material from the surface of a workpiece. However, it can be difficult for these tools to shave consistent, uniform layers of material from a surface to produce a desired flatness or smoothness, and there is a significant risk that the blade of the accessory tool will gouge the surface and possibly ruin the workpiece.

What is needed is an accessory tool for a handheld oscillating power tool that enables substantially uniform shavings to be removed from the surface of a workpiece while preventing the blade from gouging the surface.

SUMMARY

In accordance with one embodiment of the present disclosure, an accessory for a power tool includes a mounting portion configured to mate with an oscillating drive member of a power tool and a substantially planar guide portion extending forwardly of the mounting portion to a leading edge and defining a guide plane. A cantilever arm is located between the mounting portion and the leading edge. The cantilever arm extends downwardly from the guide plane and forwardly toward the leading edge. A plurality of teeth extending from a forward portion of the cantilever arm.

In another embodiment, an accessory for a power tool includes a mounting portion configured to mate with an oscillating drive member of a power tool, and a substantially planar guide portion located forwardly of the mounting portion. The guide portion includes a guide surface arranged facing in a first direction and defines a guide plane. A cantilever arm is located forwardly of the mounting portion. The cantilever arm includes a cutting edge that is spaced apart from the guide surface in the first direction. A plurality of teeth extends from the cutting edge.

DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Figure 2:
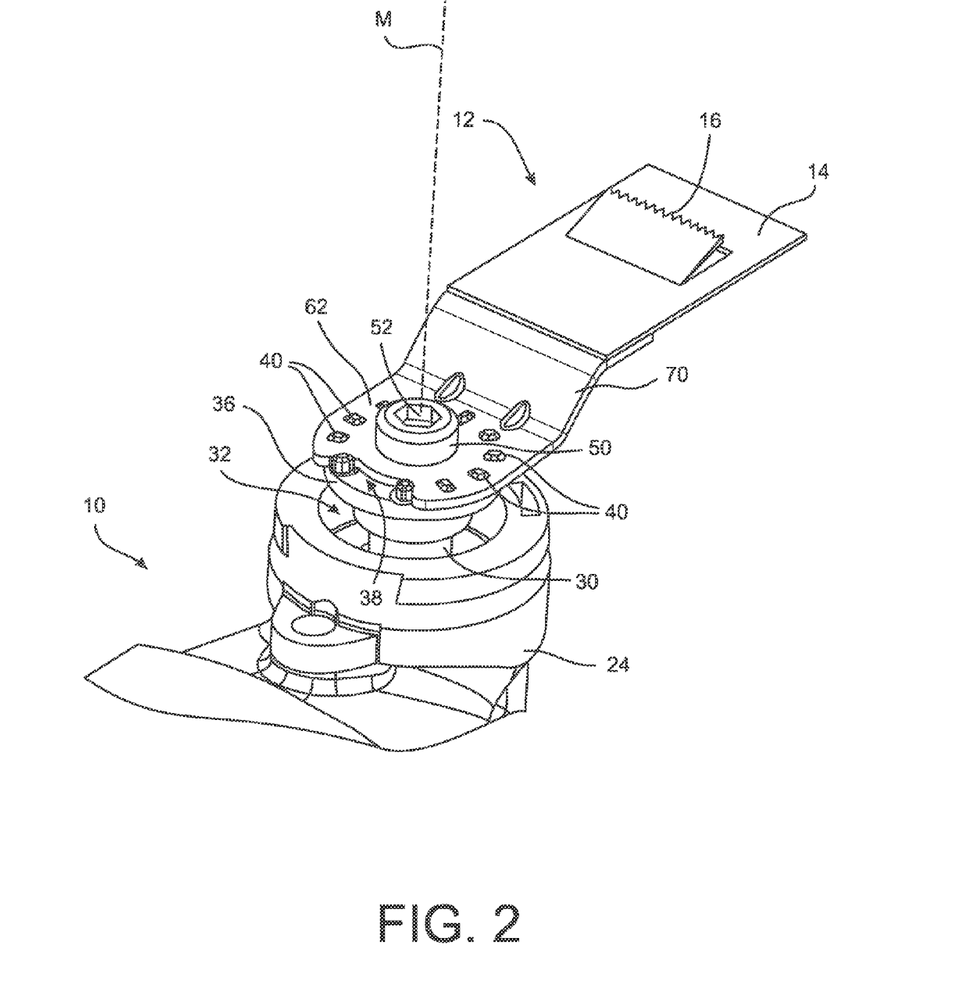
FIG. 2 is a perspective view of the nose portion of the oscillating tool and the planer accessory tool of FIG. 1 from below.
Figure 3:
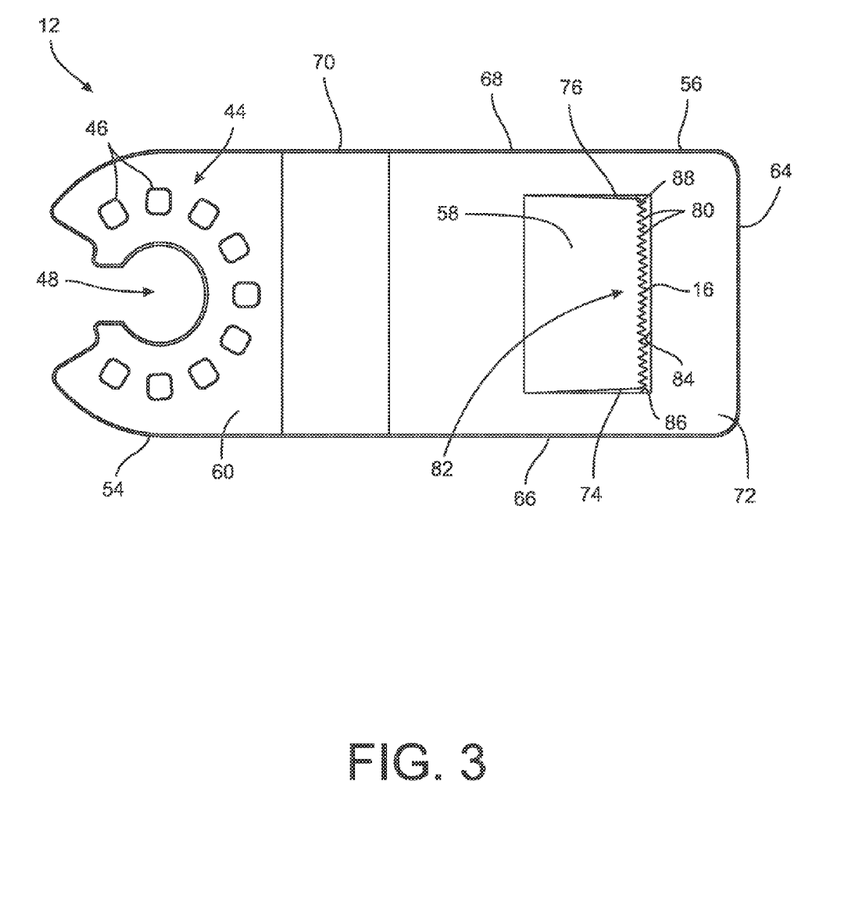
FIG. 3 is a top elevational view of the planer accessory tool of FIG. 1.
Figure 4:
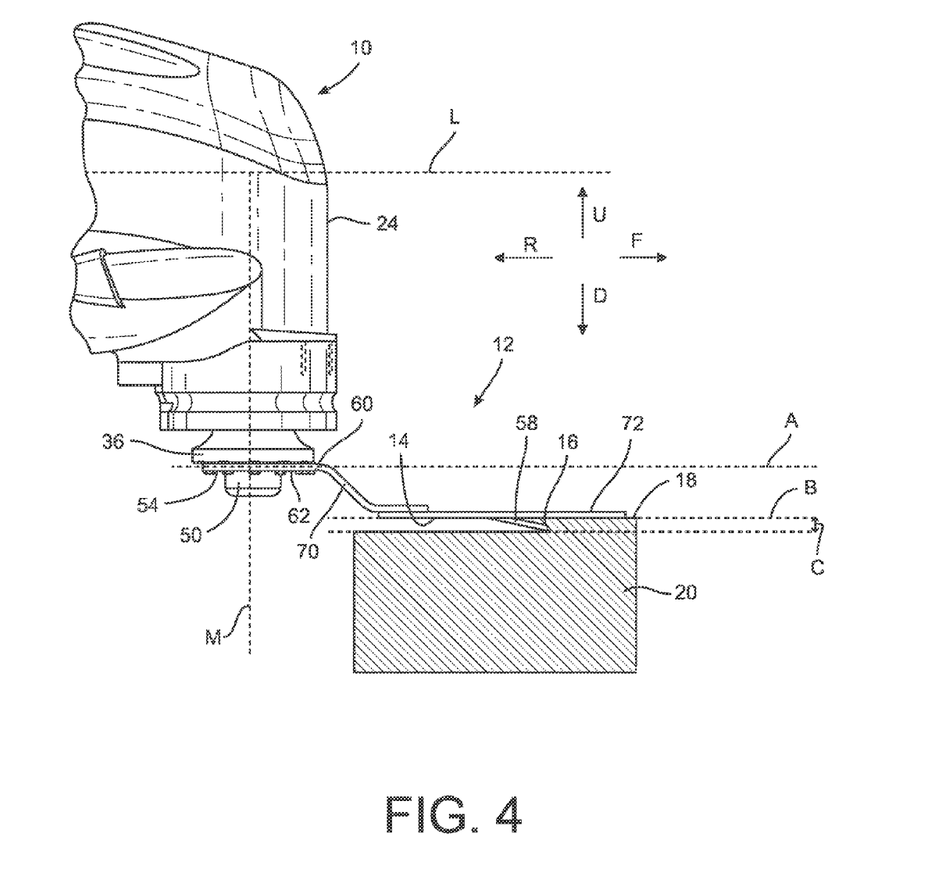
FIG. 4 is a side elevational view of the nose portion of the oscillating tool and the planer accessory tool of FIG. 1.

Referring to FIGS. 1-4, the present disclosure is directed to a planer attachment 12, also referred to as a planer accessory tool, for an oscillating power tool 10 that enables the oscillating power tool to be used as a planer. The planer accessory tool 12 comprises a flat guide surface 14 and a cutting edge 16. As depicted in FIG. 4, the flat guide surface 14 serves as the sole of the planer and is placed in contact with a surface 18 of a workpiece 20 that is to be planed. The cutting edge 16 is positioned a designated distance, or depth C, below the guide surface 14 to shave material from the surface 18 of the workpiece to the designated depth C. The flat guide surface 14 enables the cutting edge 16 to engage the surface 18 of the workpiece 20 at a relatively constant angle which enables substantially uniform shavings to be removed while preventing the cutting edge 16 from gouging the surface 18 of the workpiece 20.

Figure 1:
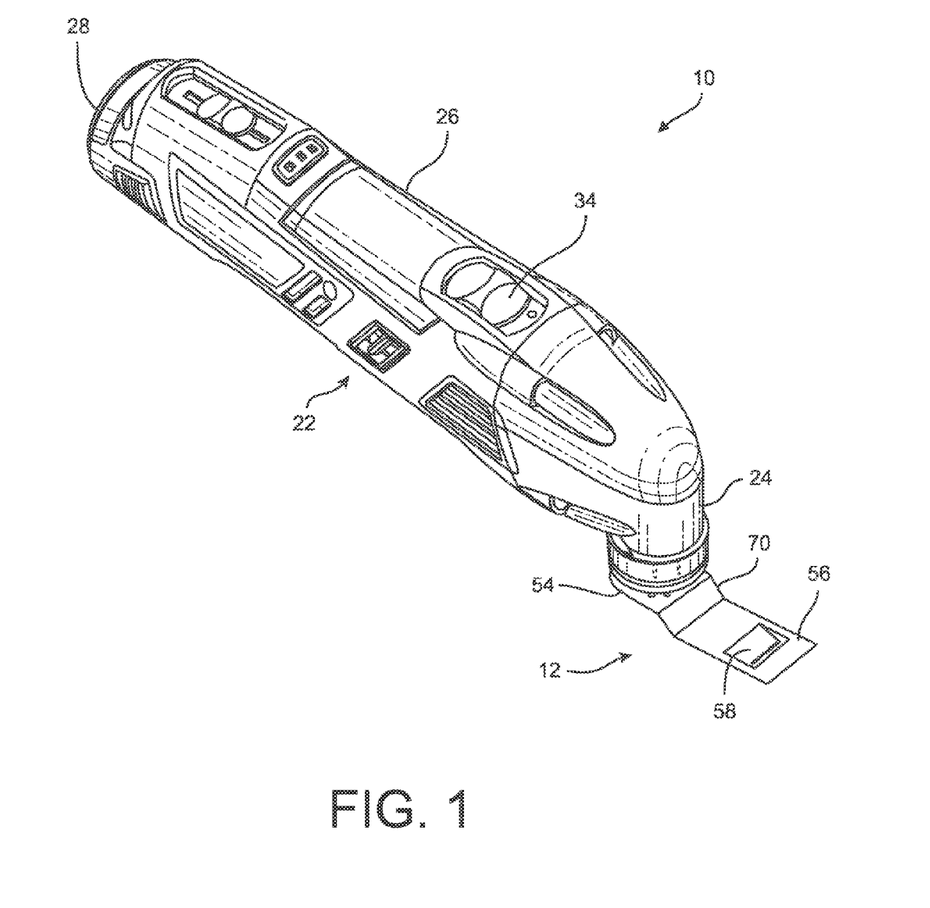
FIG. 1 is a perspective view of an oscillating tool including a planer accessory tool according to one embodiment the present disclosure.

Referring to FIG. 1, an oscillating tool 10 for driving the planer accessory includes a generally cylindrically shaped housing 22 constructed of a rigid material such as plastic, metal, or composite materials such as a fiber reinforced polymer. The housing 22 includes a nose portion 24 and a handle portion 26. The handle portion 26 encloses a motor (not shown). In one embodiment, the motor comprises an electric motor configured to receive power from a rechargeable battery 28 connected at the base of the handle portion 26. In other embodiments, electric power for the motor may be received from an AC outlet via a power cord (not shown). As an alternative to electric power, the oscillating power tool 10 may be pneumatically or hydraulically powered. Power to the motor is controlled by a power switch 34 provided on the handle portion 24 of the housing 22.

The housing 22 defines a longitudinal axis L. An oscillating drive member 30 (FIG. 2) extends through an opening 32 defined in the nose portion 24 of the housing 22 generally perpendicularly with respect to the longitudinal axis L. The motor is configured to oscillate the drive member 30 about its axis M at high frequencies, e.g., 5,000 to 25,000 oscillations per minute, with a small oscillating angle, typically in a range of between 0.5° and 7°.

The drive member 30 supports an accessory tool holder 36 exterior to the housing 22. The tool holder 36 is configured to releasably secure various accessory tools to the drive member, such as the planer accessory tool 12. As the tool holder 36 is oscillated by the drive member 30, an accessory tool secured to the tool holder 36 is driven to oscillate about the axis M of the drive member 20. Accessory tools are configured to utilize the oscillating movement to perform a particular function, such as sanding, grinding, or cutting, depending on the configuration of the accessory tool.

To enable a secure connection between the tool holder 36 of the power tool 10 and accessory tools for use with the power tool, the tool holder 36 and associated accessory tools are provided with drive structures 38, 44 that mate to secure the accessory tool to the tool holder 36. In the embodiments described herein, the tool holder 36 includes a tool drive structure 38 that comprises a plurality of protrusions 40 arranged in a circular pattern about a central bore (not visible).

Accessory tools for use with the power tool 10, such as the planer accessory tool 12, include an accessory drive structure 44 that is configured to mate or interlock with the tool drive structure 38 of the tool holder 36. As depicted in FIG. 3, the accessory drive structure 44 of the planer accessory tool 12 includes a plurality of openings or recesses 46 and a central opening 48 that are sized, shaped, and positioned complementary to the protrusions 40 and central bore, respectively, of the tool drive structure 38. When the accessory tool 12 is placed onto the tool holder 36, the opening 48 is aligned with the central bore of the tool drive structure 38, and the protruding features 40 of the tool drive structure 38 are received in the corresponding openings and/or recesses 46 defined in the accessory drive structure 44.

A clamping member 50, such as a clamping screw, is used to press the accessory drive structure 44 of the accessory tool 12 into interlocking engagement with the tool drive structure 38 thus securing the accessory tool 12 to the tool holder 36. The interlocked drive structures 36, 44 enable the oscillating movement of the tool holder 36 to be imparted to the accessory tool 12. In one embodiment, the central bore in the tool holder 36 is threaded in order to mesh with the longitudinal threaded portion of the clamping screw 50. The head of the clamping screw 50 includes a hexagonal recess 52 that enables the clamping screw 50 to be rotated by a complementary shaped driver tool, such as an Allen wrench or the like (not shown).

One embodiment of a planer accessory tool 12 is depicted in FIGS. 1-4. The planer accessory tool 12 includes a mounting portion 54, a guide portion 56, and a cutting portion 58. The mounting portion 54 has a generally flat disc-like shape including an upper surface 60 and a lower surface 62. The openings 46 of the accessory drive structure 44 are formed in the mounting portion 54 extending through the upper and lower surfaces 60, 62. The mounting portion 54 is secured to the tool holder 36 with the upper surface 60 facing upwardly in direction U toward the nose portion 24 of the power tool 10. When secured to the tool holder 36, the mounting portion 54 is arranged generally perpendicular to the axis M of the drive member 30 and oscillates substantially in a first plane A, or oscillation plane, that intersects the tool holder 36.

The guide portion 56 of the planer accessory tool 12 comprises a planar member that extends from the mounting portion 54 in the forward direction F when the planer accessory tool 12 is mounted to the tool holder 36. The guide portion 56 has a generally rectangular shape defined by a leading outer edge 64, a first lateral outer edge 66, and a second lateral outer edge 68. In the embodiment of FIGS. 1-4, the guide portion 56 is arranged perpendicular to the axis M of the drive member 30. The mounting portion 54 includes a transition region 70 that offsets the guide portion 56 and cutting portion 58 from the drive member 30 and tool holder 36 in order to prevent the drive member 30 and tool holder 36 from contacting the work piece when the guide surface 14 is positioned in contact with the workpiece.

The guide portion 56 includes an upper surface 72 and a lower surface that corresponds to the guide surface 14. The guide surface 14 is substantially flat and smooth to enable the guide surface 14 to be moved across the surface of the workpiece and to "ride" over high spots and other imperfections on the surface of the workpiece. In alternative embodiments, the guide surface may have surface features and/or coatings that are configured to reduce friction when the guide surface is moved across the surface of a workpiece. The planer accessory tool 12 is secured to the tool holder 16 with the guide surface 14 facing downwardly in direction D away from the power tool 10. The transition region 70 offsets the guide portion 56 downwardly from the mounting portion 54 to position the guide surface 14 primarily in a second plane B, referred to as the guide plane, that is parallel to and beneath the first plane A.

The cutting portion 58 of the planer accessory tool 12 comprises a cantilevered arm having a generally rectangular shape when projected onto the guide plane that is defined by a first lateral edge 74, a second lateral edge 76, a trailing edge portion 78, and a leading edge that comprises the cutting edge 16. The cantilevered arm 58 extends generally downwardly from the guide plane B and forwardly toward the leading edge 64 of the guide portion 56 to position the cutting edge 16 at the predetermined depth C below the guide surface 14 and at a fixed orientation in relation to the guide surface 14.

The cutting edge 16 comprises a generally straight, or linear, edge extending between the first lateral edge 74 and second lateral edge 76 of the cantilevered arm 58. The cutting edge 16 defines a line that is generally perpendicular to longitudinal axis L of the power tool 10 and substantially parallel to and spaced apart from the guide surface 14. As depicted, the cutting edge 16 is serrated to form a plurality of cutting teeth 80 between the first and second lateral edges 74, 76 that extend generally forwardly (i.e., in direction F) from the cutting edge 16. In other embodiments, other types of cutting edges may be implemented such as a flat, sharp edge, a knife edge, a scraping edge, or a coated abrasive edge.

During operation, the guide surface 14 is placed against the surface 18 of the workpiece 20 that is to be planed, and the tool 10 is moved forward in direction F while keeping the guide surface 14 generally flat against the surface 18. As the tool 10 is moved forward, the cutting edge 16 is oscillated by the tool drive member 30 resulting in a layer of material being shaved from the surface 18 by the cutting edge 16 to the depth C, as depicted in FIG. 4.

In the embodiment of FIGS. 1-4, the planer accessory tool has a one-piece construction with at least the guide portion 56 and the cutting portion 58 being integrally formed by stamping and bending a metal plate. For example, the cutting portion 48 of the accessory tool 12 is formed by stamping or cutting three sides of the shape of the cutting portion 58 (i.e., the first lateral edge 74, second lateral edge 76, and cutting edge 16) into the guide portion 56, and bending the cutting portion 58 downwardly along the trailing edge portion 78 to position the cutting edge 16 at the designated depth C. The stamping and bending of the metal plate to form the cutting portion 58 of the accessory tool 12 may be performed simultaneously or during separate processes.

Stamping and bending the guide portion 56 to form the cutting portion 58 of the accessory tool results in an opening or window 82 being formed in the guide portion 56. Referring to FIG. 3, the window 82 is defined in the guide portion 56 by a leading inward facing edge portion 84, a first lateral inward facing edge portion 86, a second lateral inward facing edge portion 88, and a trailing inward facing edge portion that meets the trailing edge portion 78 of the cantilevered arm 58. The window 82 formed in the guide portion 56 serves as the mouth of the planer 12 by providing a path for wood shavings to escape the area of engagement between the cutting edge 16 and the surface 18 of the workpiece.

Figure 5:
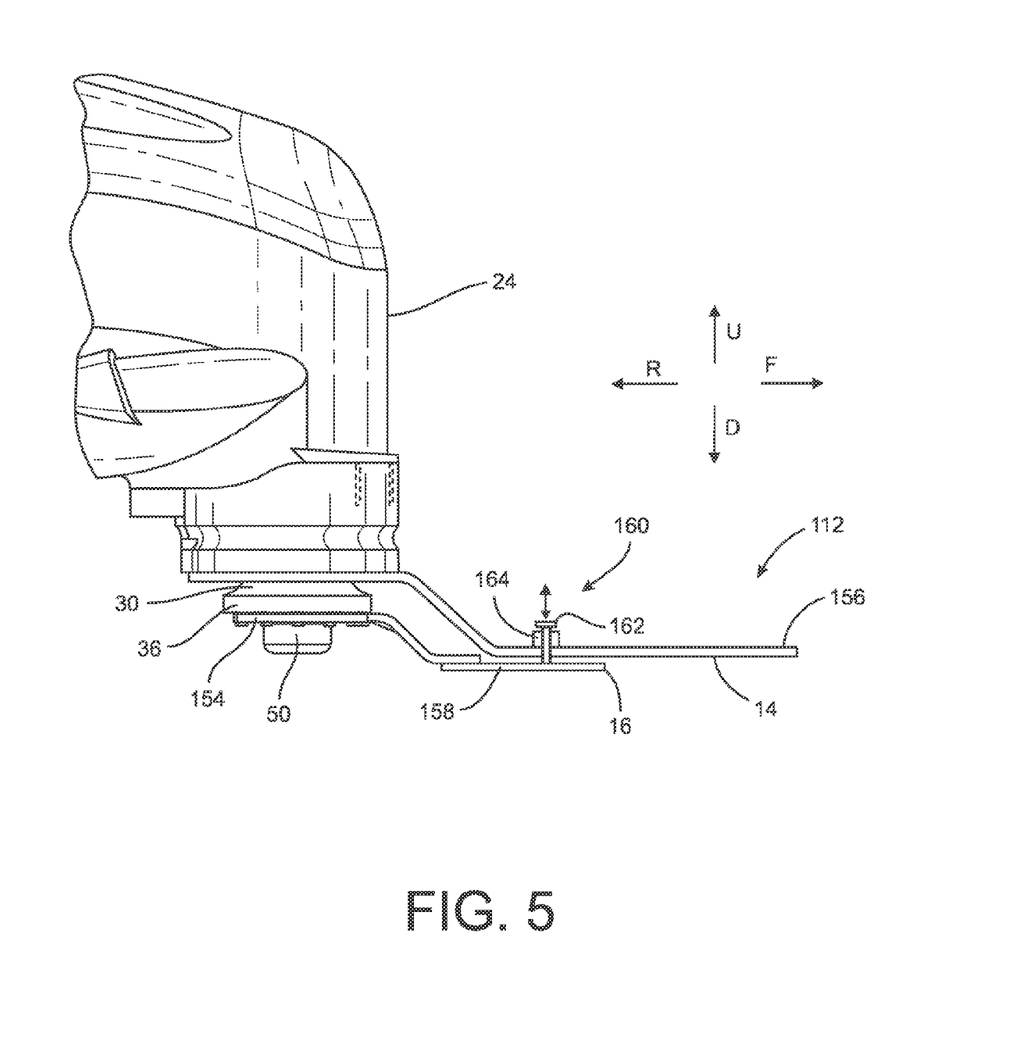
FIG. 5 is a side view of the nose portion of an oscillating tool with a second embodiment of a planer accessory tool.
Figure 6:
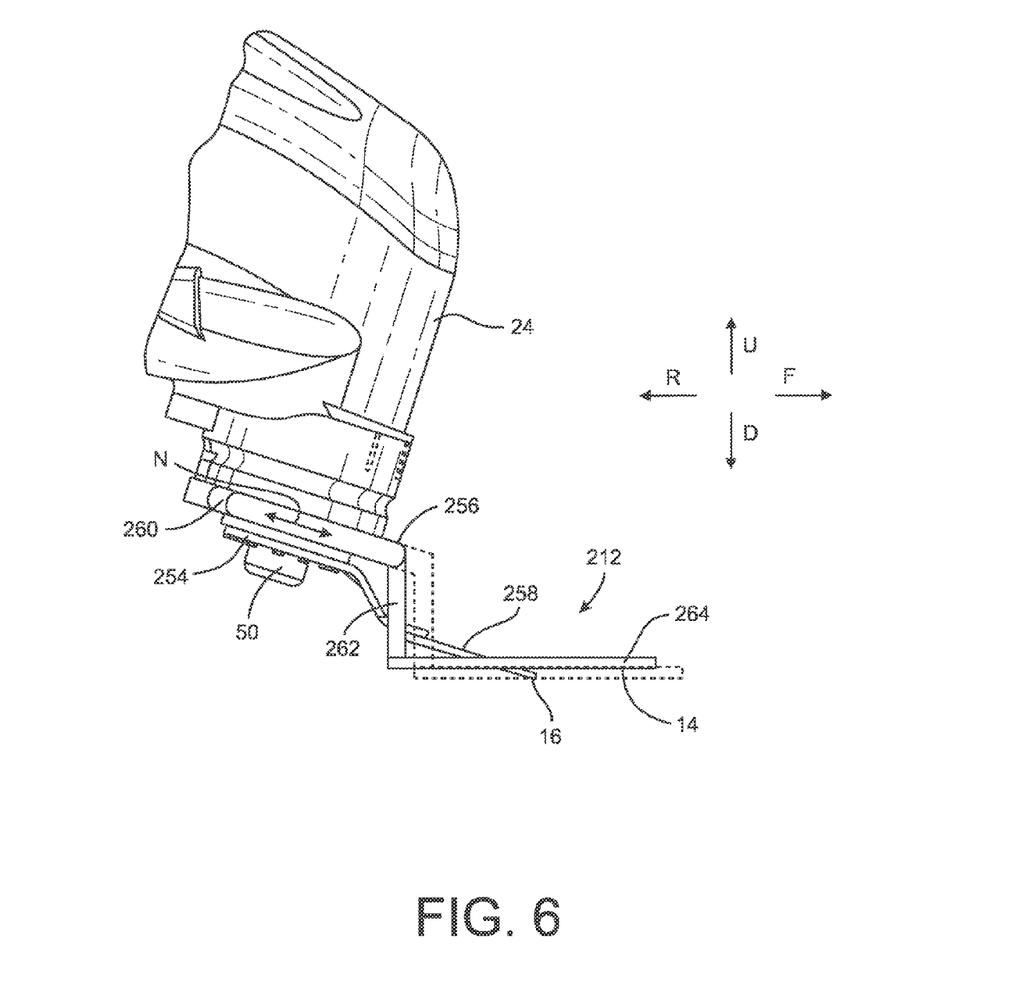
FIG. 6 is a side view of the nose portion of an oscillating tool with a third embodiment of a planer accessory tool.
Figure 7:
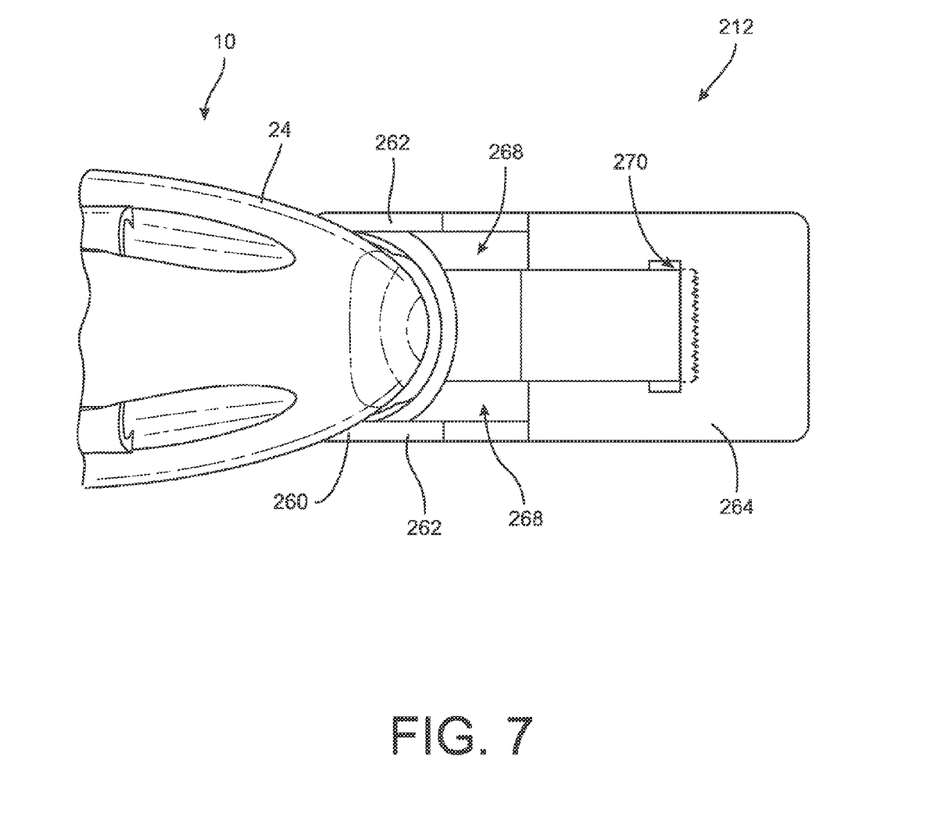
FIG. 7 is a top view of the nose portion of the oscillating tool and the planer accessory tool of FIG. 6.

In the embodiment of FIGS. 1-4, the cutting edge 16 of the power tool 10 is maintained in a fixed position and at a fixed depth in relation to the guide surface 14. FIG. 5 and FIGS. 6 and 7 depict embodiments of planer accessory tools having an adjustable cutting depth.

In the embodiment of the planer accessory tool 112 depicted in FIG. 5, the cutting depth of the planer accessory tool 112 is adjusted by controlling the position of the cutting edge 16 in relation to the guide surface 14. As depicted, the cutting portion 158 and the mounting portion 154 have a unitary construction with the cutting portion 158 being cantilevered from the mounting portion 154. The guide portion 156 comprises a metal plate positioned above the cutting portion 158. As depicted, the guide portion 156 is attached to the drive member 30 and extends from the drive member over the cutting portion 158. Alternatively, the guide portion 156 may be attached to the mounting portion 154 and extend from the mounting portion 154 over the cutting portion 158. In either case, the guide portion 156 oscillates with the mounting portion 154 and cutting portion 158.

The cutting portion 158 is movably positioned in relation to the guide portion 156 by a depth adjustment mechanism 160. The depth adjustment mechanism 160 is configured to locate the cutting portion 158 closer to or farther away from the guide surface 14 in order to control the depth of the cutting edge 16 in relation to the guide surface. As depicted, the depth adjustment mechanism 160 comprises a pin or rod 162 that is translatably positioned in a bore structure 164 provided in the guide portion 156. The pin 162 protrudes from the bore structure 164 and guide surface 14 to contact the upper surface of the cutting portion 158. In one embodiment, the protruding end of the pin 162 is rotatably secured to the upper surface of the cutting portion so that, as the pin is translated in the bore structure, the cutting portion is drawn closer or pushed farther away from the guide portion. Alternatively, the protruding end of the pin 162 is not secured to the cutting portion. In this embodiment, the cutting portion 158 is bent to form a flat spring that is biased toward the guide surface 14. Contact between the pin 162 and biased cutting portion 158 maintains the cutting edge 16 at a distance or depth from the guide surface 14 that is controlled by the distance the pin 162 protrudes from the bore structure 164.

The cutting depth C of the cutting edge 16 is adjusted by translating the pin 162 in relation to the bore structure 164 to change the distance that the pin 162 protrudes from the bore structure 164. For example, in order to increase the cutting depth of the cutting portion, the pin is translated downwardly in direction D in the bore structure 164 so that it protrudes farther from the bore structure 164 toward the cutting portion 158. To decrease the cutting depth, the pin 162 is translated upwardly in relation to the bore structure 164 which retracts at least a portion of the pin 162 into the bore structure 164 thereby allowing the cutting portion 158 to move closer to the guide surface 14. The pin 162 is configured to be releasably secured at any one of a plurality of positions in relation to the bore structure 164. In one embodiment, the pin 162 and the bore structure 164 are configured for threaded engagement although any suitable means of releasably securing the pin 162 in relation to the bore structure 164 may be utilized.

In the embodiment of the planer accessory tool 212 depicted in FIGS. 6 and 7, the cutting depth of the planer accessory tool 212 is adjusted by controlling the position of the guide portion in relation to the cutting edge 16. As depicted in FIG. 6, the accessory tool 212 includes a guide member 256 that is provided as a separate component from the mounting portion 254 and cutting portion 258 of the accessory tool. The guide member 256 is secured to the nose portion 24 of the tool housing 22 and does not oscillate with the mounting and cutting portions 254, 258 of the accessory tool 212.

The guide member 256 includes an attachment portion 260 for securing the guide member 256 to the nose portion 24 of the tool 10. The attachment portion 260 allows the guide member 256 to translate in the forward direction F and rearward direction R in relation to the nose portion 24 of the power tool 10 along an axis N that is substantially parallel to the longitudinal axis L of the tool 10.

The guide member 256 includes a leg portion 262 and a foot portion 264. The leg portion 262 extends generally downwardly from attachment mechanism 260. The foot portion 264 is attached to the end of the leg portion 260 extending generally forwardly from the leg portion 262. As depicted in FIG. 6, the foot portion 264 is angled generally upwardly from the end of the leg portion 262. The foot portion 264 includes a bottom surface that serves as the guide surface 14, or sole, for the planer accessory tool 212.

Referring to FIG. 7, the leg portion 262 of the guide member 256 defines a first opening 268 through which the cutting portion 258 of the accessory tool 212 extends in the forward direction F. The foot portion 264 defines a second opening 270 that serves as the mouth of the planer accessory tool 212. The cutting portion 258 extends through the second opening 270 to position the cutting edge 16 below the guide surface 14 of the guide member.

The attachment portion 260 enables the guide member 256 to translate forwardly and rearwardly in relation to the cutting portion 258 between a first location where the leading edge of the 64 of the guide portion is positioned a first distance away from the cutting edge, and a second location where the leading edge 64 is positioned a second distance away from the cutting edge that is less than the first distance. To increase the cutting depth C of the accessory tool 212, the guide member 256 is translated in the rearward direction R. As the guide member 256 is translated rearwardly, the cutting edge 16 remains in position resulting in the cutting edge protruding farther from the second opening 270 thereby increasing the distance between the cutting edge 16 and the leading edge of the guide portion 256 and causing the cutting edge 16 to be spaced farther away from the guide surface 14. To decrease the cutting depth C, the guide member 256 is translated in the forward direction F which results in the cutting edge protruding less from the second opening 270 thereby decreasing the distance C between the cutting edge 16 and the guide surface 14.

The angled orientation of the foot portion 264 allows the cutting portion 258 to remain perpendicular to the drive member as the cutting portion 258 is extended through the second opening 270 defined in the foot portion 264. The angled foot portion 264 also allows the guide portion 256 to slide forwardly and rearwardly in relation to the cutting portion without altering the orientation of the cutting portion 258 in relation to the guide surface 14.

Figure 8:
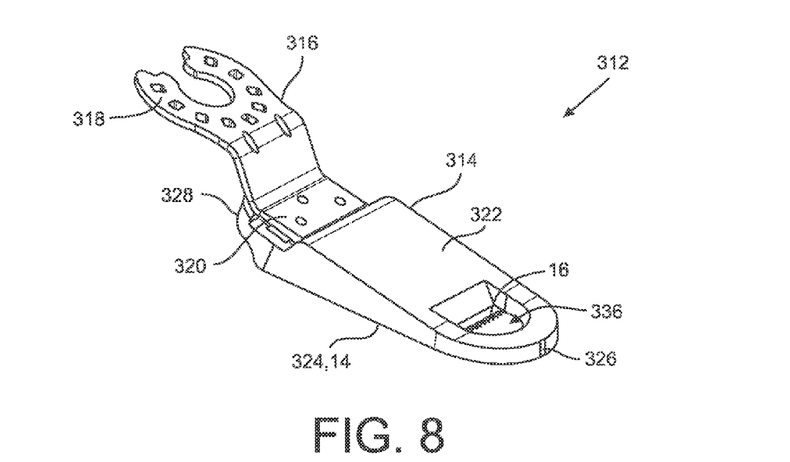
FIG. 8 is a perspective view of another embodiment of a planer accessory tool for an oscillating power tool.
Figure 9:
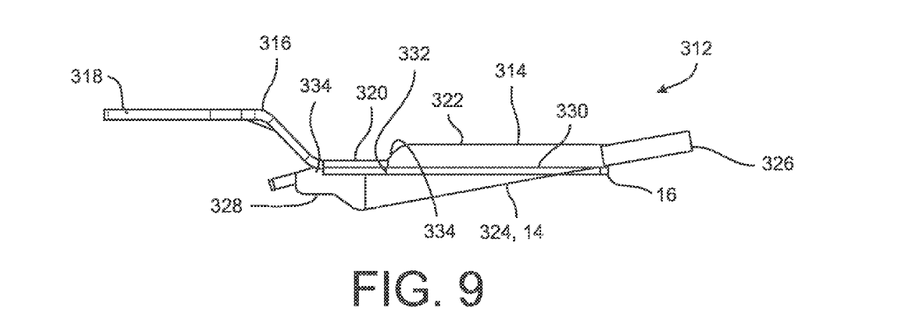
FIG. 9 is a side view of the planer accessory tool of FIG. 8.
Figure 10:
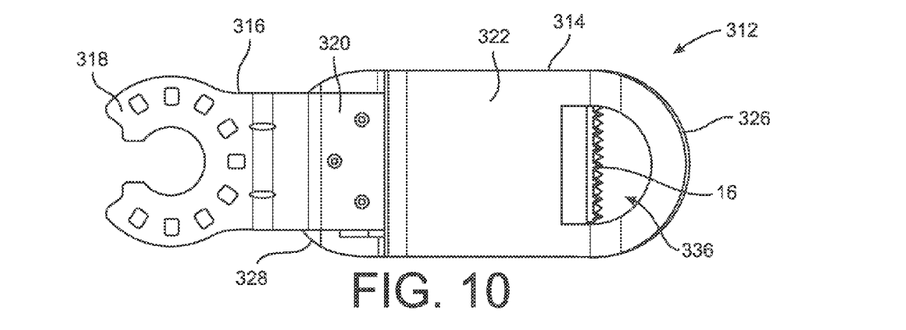
FIG. 10 is a top view of the planer accessory tool of FIG. 8.

Referring now to FIGS. 8-10, another embodiment of a planer accessory tool 312 is depicted that comprises a guide attachment 314 for a blade accessory tool 316 that enables the blade accessory tool 316 to be converted to a planer. The blade accessory tool 316 comprises a mounting portion 318 and a cutting portion 320. The guide attachment 314 is provided as a separate component that is removably attached to the blade accessory tool 316 and therefore oscillates with the blade accessory tool 316 during use.

The guide attachment 314 comprises a body having a top surface 322, a bottom surface 324, a leading end 326, and a trailing end 328 formed of a rigid, durable material, such as plastic or metal. The body is provided with a slot or channel 330 that extends through the top and bottom surfaces 322, 324 for receiving the cutting portion 320 of the blade accessory tool 316. The cutting portion 320 is inserted into the slot through an access opening 332 defined in the top surface 322 and is extended into the slot until the cutting edge 16 protrudes beneath the bottom surface 324, as depicted in FIG. 9. The bottom surface 324 is generally flat and serves as the guide surface 14, or sole, of the planer. The slot 330 extends through the body at an angle in order to arrange the cutting edge 16 at an appropriate angle with respect to the guide surface 14 to perform planing tasks.

The trailing end 328 of the guide attachment 314 is configured to engage the blade accessory tool 316 in order to retain the guide attachment 314 and blade accessory 316 in a fixed position in relation to each other. In one embodiment, the trailing end 328 of the guide attachment 314 includes detents 334 for engaging edges of the metal plates used to form the blade accessory tool 316 although other suitable methods of removably attaching the guide attachment to the blade accessory tool may be used.

The leading end 326 of the guide attachment 314 is configured to extend forwardly of the cutting edge 16 when the guide attachment 314 is attached to the blade accessory tool 316. The leading end 322 defines an opening 336, i.e., the mouth of the planer, that extends through the top and bottom surfaces 322, 324 to provide a path for wood shavings to escape the area of engagement between the cutting edge 16 and the surface of a workpiece (now shown).

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. An accessory for an oscillating power tool, comprising:
a mounting portion including a plurality of openings configured to receive a plurality of protrusions of a tool drive structure to mate with a tool holder of the oscillating power tool, the mounting portion defining a first plane;
a substantially planar, rectangular guide portion extending forwardly of the mounting portion to a leading edge and having a flat lower guide surface defining a guide plane;
a transition region that is interposed between the mounting portion and the guide portion, the transition region extending downwardly from the mounting portion to position the guide portion such that the guide plane is parallel to and offset below the first plane; and
a cantilever arm having a cutting edge and extending downwardly from the guide portion to position the cutting edge a predetermined depth below the guide surface and forwardly toward the leading edge, the cutting edge including a plurality of cutting teeth extending forwardly from the cutting edge,
wherein the guide portion includes an opening that extends through the guide portion,
wherein the cantilever arm extends forwardly and downwardly beneath the opening, and
wherein the cutting edge of the cantilever arm is arranged substantially parallel to and spaced apart from the guide surface.

2. The accessory of claim 1, wherein:
the mounting portion defines an oscillation plane; and
the guide plane is beneath and substantially parallel to the oscillation plane.

3. The accessory of claim 1, wherein:
the cantilever arm has a generally rectangular shape.

* * * * *